Feb. 5, 1935.  G. W. McGUIRE  1,989,815
RAKE
Filed June 24, 1930
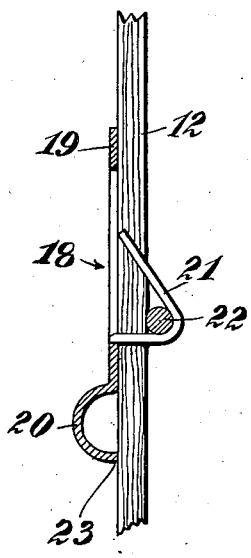
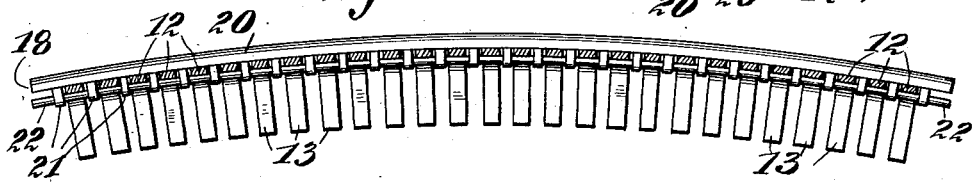
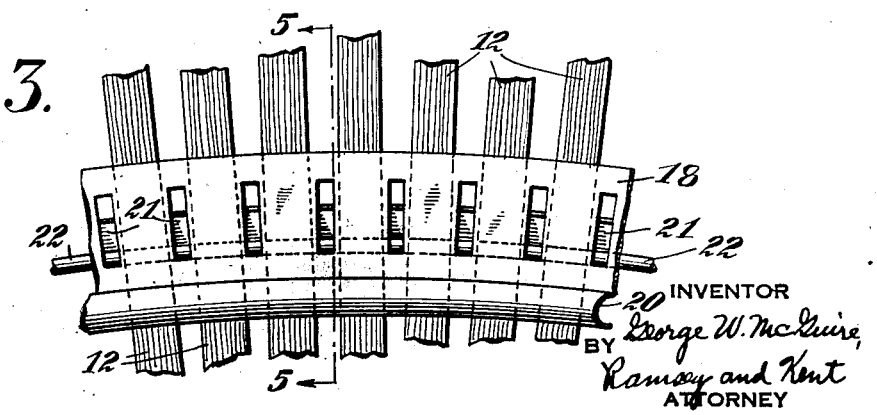

Patented Feb. 5, 1935

1,989,815

UNITED STATES PATENT OFFICE 1,989,815

RAKE

George W. McGuire, Beechhurst, N. Y., assignor to The American Fork & Hoe Company, Cleveland, Ohio, a corporation of Ohio Application June 24, 1930, Serial No. 463,428

19 Claims. (Cl. 55—114)

This invention relates to bamboo rakes such as are used for raking leaves and other similar purposes.

A principal object of the invention is to provide a simple and efficient reenforcing and spacing clip, preferably formed of metal, to hold the tines of the rake in their proper spaced apart relation.

An additional object resides in providing a clip that is curved above what would otherwise be the normal flat plane of the bamboo tines so that the outer end of the rake is arched rather than flat, thereby facilitating contact of all of the tines with the ground when the rake is in use.

Further objects and advantages of the invention will become apparent as the description proceeds.

While a preferred form of the invention is disclosed herein for purposes of illustration, it should be understood that various changes and modifications may be made in the structure and arrangement of parts without departing from the spirit of the invention.

In the drawing:

Figure 1 is a plan view of a bamboo rake embodying the invention;

Figure 2 is a section taken on the line 2—2 of Figure 1;

Figure 3 is an enlarged fragmentary plan showing the details of the metal clip and its method of attachment;

Figure 4 is a plan view of the reverse side of the structure shown in Figure 3;

Figure 5 is a section taken on the line 5—5 of Figure 2.

Referring to the drawing more particularly, it will be seen that the rake includes a handle 10, only the lower portion of which has been shown, to the lower part of which are attached a plurality of flat bamboo strips 11. Each of the strips 11 is split at its outer end to form preferably two of the tines 12, and the outer end of each tine 12 is permanently bent to form a finger 13 which extends approximately at right angles to the tine 12. The inner ends of the strips 11 are superimposed and are fastened to the handle 10 at a point spaced from the end of the handle by means of a suitable clip such as that illustrated at 14. A wooden strip 15 is placed across each side of the strips 11 at the end of the handle 10 and these strips 15 are fastened together as by a wire binding 16. The handle 10 is attached to the strips 15 by a rivet or other fastening 17.

In order to reenforce the broom and hold the tines in evenly spaced apart position, the clip 18 is provided. As shown in Figure 5, the clip 18 comprises a flat portion 19 which has along one side a semi-cylindrical stiffening rib 20. This stiffening rib 20 is provided to hold the clip in as rigid and inflexible a manner as possible within the limits of the size and weight and strength of the steel employed. In order to attach the clip to the rake tines a finger 21 is stamped from the part 19 and extends between each pair of tines and extends around a wire rod 22 which is located on the opposite side of the tine from the clip 18. This construction provides a very simple and inexpensive method of attaching the clip to the rake tines.

In making the body of the clip the outer edge 23 of the rib 20 is formed depressed below the bottom plane of the clip body, so that when the clip is assembled on the tines the edge 23 presses firmly against the tines and keeps them from shifting laterally, thus holding their outer ends evenly spaced.

Due to the fact that all of the strips 11 are of the same length, when they are arranged fanwise to form the rake, the outer end of the rake is given a semi-circular contour. According to prior art construction the tines 12 are disposed in a flat plane and as a result of this construction, when the rake is held at the angle of normal use only the tines in the center of the rake are in contact with the ground, the tines at the edge being elevated above the ground. In order to overcome this defect the clip 18 is arched upwardly in the middle (considering the rake lying flat as in Figure 1) so as to hold the tines 12 arched in the center above what would otherwise be the flat plane of the tines. With this arrangement the teeth 13 at each side of the rake are depressed as clearly shown in Figure 2, and when a rake thus constructed is held with the handle at the normal angle for using the rake, all of the tines are in contact with a level surface representing the ground.

The semi-cylindrical stiffening rib 20 serves to reenforce the clip and hold it in a vertically arched shape in order to hold the tines arched in the manner just described. The flexibility of the tines 12 beyond the clip is sufficient to permit them to yield to any inequalities of the ground on which the rake is used.

In bamboo rakes of this general type, as previously constructed, it was necessary to extend the strips 15 beyond the sides of the rake body in order to hold the side tines securely in place. These extending ends of the strips 15 were very unsightly and caught on objects while the rake was being used, thereby causing annoyance and weakening the rake. In the present construction the side tines are securely held by the metal clip 18, and it is therefore possible to cut off the strips 15 flush with the outside tines, discontinuing the wire binding just short of the outside tine on each side of the rake. This construction is much neater and more durable than the old arrangement, as will be evident.

I claim:

1. A rake comprising a handle, a plurality of tine strips, the inner end of each tine strip being secured to the handle, a clip disposed across the tine strips and attached to at least some of the tine strips, the clip being so shaped and disposed as to hold the outer ends of the middle tines higher than the outer ends of the tines at the sides of the rake.

2. A rake comprising a handle, a plurality of tine strips of approximately equal length disposed in a manner to give the outer end of the rake a semi-circular shape, the inner end of each tine strip being secured to the handle, a clip disposed across an intermediate portion of the tine strips, the clip being arched upwardly in the middle so as to hold the outer ends of the tines in an arched position with the middle tines higher than the tines at the sides of the rake.

3. A rake comprising a handle, a plurality of tine strips of approximately equal length disposed in a manner to give the outer end of the rake a semi-circular shape, the inner end of each tine strip being secured to the handle, a metal clip disposed across an intermediate portion of the tine strips, the clip being arched upwardly in the middle so as to hold the outer ends of the tines in an arched position with the middle tines higher than the tines at the sides of the rake, the clip having a stiffening rib to hold it in its arched form.

4. A rake comprising a handle, a plurality of tines, each tine having its inner end secured to the handle, the outer ends of the tines being disposed in a semicircle, a metal clip disposed across an intermediate portion of the tines, the clip being arched upwardly in the middle so as to hold the outer ends of the tines in an arched position with the middle tines higher than the tines at the sides of the rake.

5. A rake comprising a handle, a plurality of tines, each tine having its inner end secured to the handle, the outer ends of the tines being disposed in a semicircle, a metal clip disposed across an intermediate portion of the tines, the clip being arched upwardly in the middle so as to hold the outer ends of the tines in an arched position with the middle tines higher than the tines at the sides of the rake, the clip having a stiffening rib to hold it in its arched form.

6. A rake comprising a plurality of tines, a reenforcing and spacing clip comprising a body portion disposed on one side of the tines, a lateral edge of the body being formed with a stiffening rib, a plurality of fingers stamped from the portion of the body intermediate its lateral edges, a strip located on the side of the tines opposite the body of the clip, the fingers being bent around the strip, and some of the fingers extending between adjacent tines.

7. A rake comprising a plurality of tines, a reenforcing and spacing clip comprising a body portion disposed on one side of the tines, a plurality of fingers stamped from the portion of the body intermediate its lateral edges, a strip located on the side of the tines opposite the body of the clip, the fingers being bent around the strip, and some of the fingers extending between adjacent tines.

8. A rake comprising a handle, a plurality of bamboo tines, the inner end of each tine being secured to the handle, a pair of wooden strips extending transversely of the tines and ending flush with the tines on each side of the rake, one of the strips being disposed on each side of the rake, wire binding holding the strips together, the wire binding ending inside of the outside tine on each side of the rake, the handle being attached to at least one of said strips, a metal clip extending transversely of tines at a point beyond the end of the handle, both of the outside tines being secured to the metal clip.

9. In a rake, a handle, a plurality of resilient tines extending forwardly divergingly from and inwardly convergingly to and supported on the handle, a transversely disposed element attached to portions of the tines intermediate their ends and disposing the tines so that their outer ends define a forwardly convex line on the ground when the rake is held by the handle in the normal position of use.

10. A rake as described in claim 9 and in which the transverse element is formed from sheet metal and of arched configuration.

11. A rake as described in claim 9 and in which the transverse element is formed from sheet metal and provided with a bend-resisting transversely deflected longitudinally extending portion.

12. A rake as described in claim 9 and in which the transverse element is formed from sheet metal and has tongues bent therefrom for attaching the tines thereto.

13. A rake as described in claim 9 and in which the transverse element is formed from sheet metal and has looped tongues bent therefrom extending between and beyond pairs of adjacent tines and a key element is disposed in the loops and the tines are clamped between the key element and the transverse element.

14. In a broom rake, in combination with the handle, a plurality of tines therefor having ground engaging spaced free ends and fixed ends, said fixed ends held together and to the rake handle in converged relation, said tines being independently flexibly movable in the portion toward their free ends, a transverse element attached to the tines at portions intermediate their ends and disposing said tine portions relatively to generally define a portion of the lateral surface of a cone.

15. In a broom rake, in combination with the handle, a plurality of tines therefor having ground engaging spaced free ends and fixed ends, said tines being independently flexibly movable in the portions toward their free ends, said tine portions being relatively disposed to generally define a portion of the lateral surface of a cone, and a forwardly and rearwardly arched reinforcing element secured to the tines intermediate their ends.

16. The rake substantially as set forth in claim 15, characterized by said reinforcing element being also arched upwardly and downwardly.

17. The rake substantially as set forth in claim 15, characterized by having the free ends of the tines disposed so as to define a curve extending transversely and also vertically of the plane of the handle.

18. A broom rake comprising in combination a handle, a cross head element secured near an end of the handle, a plurality of rake tines extending fan-wise from the handle rearwardly of said cross head element and affixed to the handle thereat, said tines extending forwardly of said cross head and a transverse element attached to the tines forwardly of the cross head element disposing the tines so that their outer ends define a forwardly convex line on the ground when the rake is held by the handle in the normal position of use.

19. In a rake of the type known generally as yard brooms, in combination with a rake handle and a plurality of tines extending fan-wise from the handle, a tine reinforcing and spacing member extending in a direction transversely of the handle having at least a portion superposed on corresponding outer surfaces of the tines, said member provided with spaced tine spacing portions in the form of hooks extending between the tines, and a common key means for all of the tines extending through the spaced hooks thereby provided to secure the member and tines together, said member being arched in two angularly different directions presenting one convexly curved surface towards the free ends of the tines and presenting another convexly curved surface upwardly thereof.

GEORGE W. McGUIRE.